May 19, 1942.   O. JACOBSEN   2,283,369
DIAPHRAGM VALVE
Filed Sept. 16, 1939   2 Sheets-Sheet 2

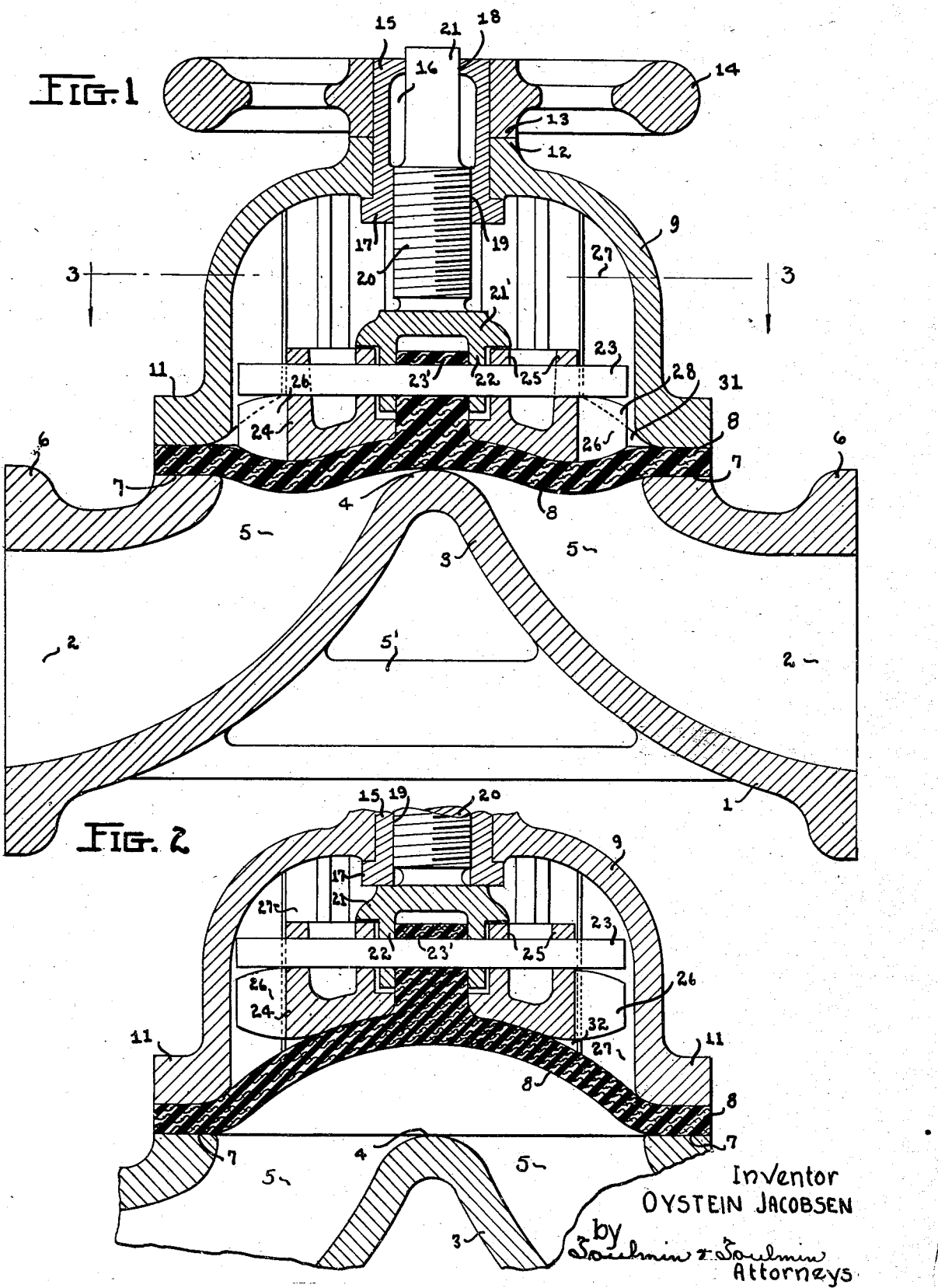

Inventor
OYSTEIN JACOBSEN
by
Toulmin & Toulmin
Attorneys

Patented May 19, 1942

2,283,369

UNITED STATES PATENT OFFICE 2,283,369

DIAPHRAGM VALVE

Oystein Jacobsen, Montgomery County, Ohio, assignor to The Duriron Company, Inc., Dayton, Ohio, a corporation of New York Application September 16, 1939, Serial No. 295,320

3 Claims. (Cl. 251—24)

This invention relates to valves of the kind which employ an obturating member in the form of a flexible diaphragm to regulate the rate of flow of a fluid through the valve. The diaphragm co-acts with a seat between ports which communicate with the inlet to and the outlet from the valve respectively.

A typical form of valve found on the market and over which the present invention represents an improvement is constituted of a diaphragm, the outer peripheral edge of which is secured between the valve bonnet and the valve seat formed on the pipe body and the inner portion of the diaphragm is flexed from a concave position when the valve is open to a convex position when the valve is closed. When the diaphragm is in its concave or open position, the backing member consists of a plurality of bars spaced from one another and which define a concave surface corresponding to the surface of the diaphragm. For flexing the diaphragm in the convex or closed valve position a manually operated plunger is employed which carries a plurality of bars which are so spaced as to interleave with the bars of the backing member so that as the plunger is forced downwardly, bars carried by the plunger cause the diaphragm to flex from a concave to a convex position. The extreme convex position of the diaphragm is determined by an arcuate surface formed on a grating which extends over the openings in the pipe mains. There is considerable space between the grating elements of the prior art structures so that as the diaphragm is held against the grating by the bars carried at the end of the plunger, there are still substantial areas of the diaphragm which have no direct backing member. The same thing is true when the diaphragm is flexed to its concave or open valve position in that there are considerable areas without any backing or support. In case the fluid passing through the pipe mains and to be controlled by the valve has relatively high velocity and hence considerable pressure, the force tending to rupture the diaphragm at any area on the diaphragm which lacks a direct metal support is quite large. Obviously in the case of the valve described above, the spaces left in the backing member when the diaphragm is in its concave or open valve position and the spaces left in the grating member when the diaphragm is in its convex or closed valve position are sufficient to reduce the rupture strength of the diaphragm to such a relatively small value as to impose on the valve severe limitations in its use. Moreover, when the diaphragm is composed of a rubberized fabric consisting of one or more layers of woven fabric connected together and coated on both surfaces with rubber, the continual flexing of the diaphragm from a concave to a convex position and vice versa causes sufficient strain in the diaphragm as inevitably to produce a short life of the valve.

The primary object of the present invention is to provide an improved construction of such valves which when opened shall afford for the fluid controlled, a stream line or nearly straight passage permitting of high velocity flow without inducing substantial resistance and in which the diaphragm of the improved valve has a continuous or unbroken metal backing over its entire area when the diaphragm is in the open or closed valve position. Another object is to provide an improved valve which is adapted to control fluid passing through two pipes in alignment, the operation and structure of the improved valve being such that the diaphragm remains flexed in the same direction regardless of whether the valve is in an open or closed condition.

Other objects and features will be apparent as the following specification is perused in connection with the accompanying drawings. As an example of an additional feature, I mount the diaphragm and its backing member on a swivel joint so that the surface of the diaphragm which contacts the fluid will bear against or tightly clamp its seat on the pipe mains in order effectively to prevent flow of fluid throughout the mains.

In the accompanying drawings:

Figure 1 is a sectional view taken through the improved valve along a limited length of the pipe main associated with the valve. In this figure, the valve is shown in its closed position.

Figure 2 is a view similar to Figure 1 but in fragmentary form and showing the valve in its open position.

Figure 4 is a view, (except for its fragmentary character) which would be presented by the structure shown in Figure 1 looking either from the right or the left in Figure 1.

Figure 3:
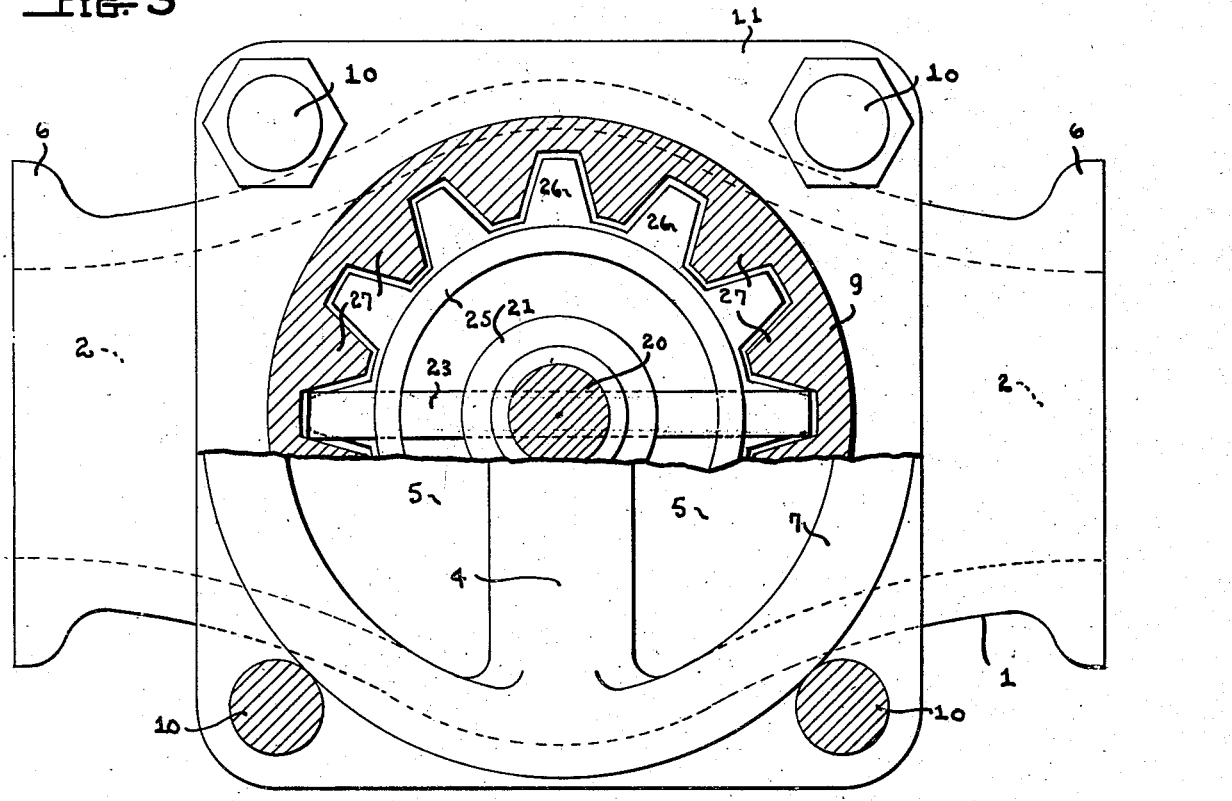
Figure 3 is a partly plan and partly sectional view taken along the irregular line 3—3 in Figure 1.

Referring to these drawings which show a diaphragm valve of the screw down type constructed in accordance with this invention, it will be seen that the valve body 1 is cast with a substantially straight through bore or passage 2 having a base wall 3 which rises gradually from the inlet and outlet ends to form a weir or hump 4. The inlet and outlet ports 2 terminate on each side of the weir 4 in large openings 5 (see Figure 3) of segmental configuration. The weir or hump 4 is of elongate configuration and therefore extends diametrically across the openings 5 so that in order for the water or other fluid to pass from the inlet to the outlet port of the valve, this fluid must flow over the weir. It is apparent that the area of each opening 5 should not be less than any area of the passageways 2.

The valve body 1 may be strengthened if desired, particularly at a position directly under the weir 4, by means of a metal web 5'. The casting 1 may be provided at each end of the valve coupling with a flange 6 by which to make a suitable connection with the incoming and outgoing pipe mains. At the periphery of the segmental openings 5, the valve body 1 terminates in a seat which has a general circular configuration as seen more clearly in Figure 3.

Figure 4:
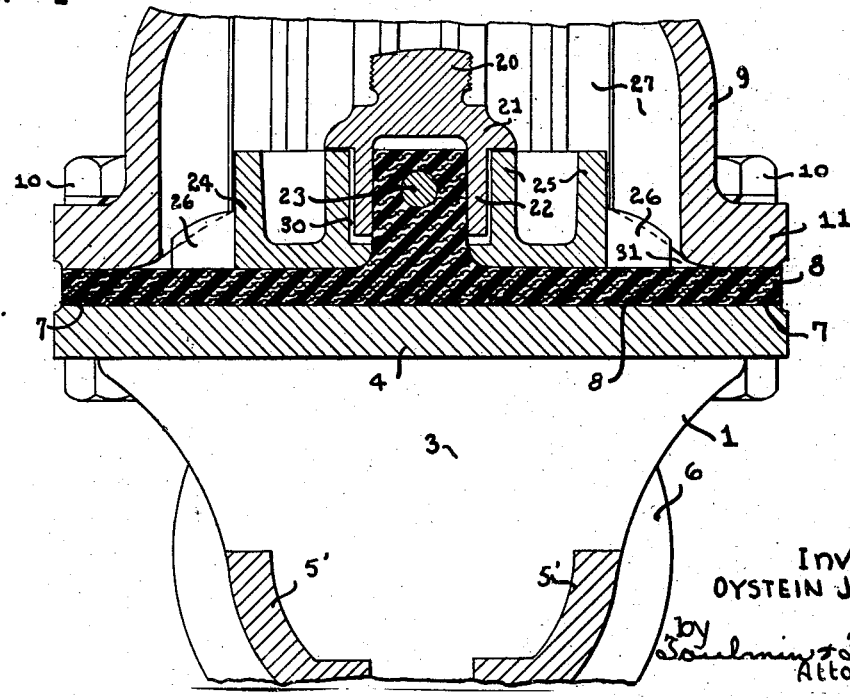
Figure 4 is a fragmentary sectional view taken along the transverse axis of the valve shown in Figure 1. In other words.

A diaphragm 8 is clamped between a bonnet 9 and the valve body 1 at the seat 7 by means of four bolts 10 which are shown in Figures 3 and 4. The diaphragm itself is composed of thick fabric which has been treated in such a way, depending on the chemical composition of the fluid passing through the valve, as to resist deterioration. In case the fluid is of an acid character, the diaphragm may be composed of a rubberized fabric consisting of one or more layers of woven fabric connected together and coated on both surfaces with rubber, the coating of rubber being of greater thickness on that side which faces the fluid. Moreover, in the case of an acid fluid, the valve body is preferably constituted of a silicon iron casting since this metal has been found to resist corrosion. The bonnet 9 and all other metal parts shown at the upper side of the diaphragm 8 in Figure 1 may be made of any suitable metal without regard to the corrosion effect since none of the acid reaches any of these parts.

The bonnet 9 takes on a hollow bell shaped configuration terminating at the bottom on an outwardly extending bange 11 of sufficient width to accommodate the bolts 10 referred to hereinbefore. The upper end of the bonnet is provided with a flange 12 on which a hand wheel 14 of any suitable and well-known design rests. The bonnet is provided with a relatively large opening at the top to receive a bushing 15 cored out as at 16 and having a shoulder 17 which bears against the under side of the flange 12. The bushing 15 has a circular opening indicated at 18 at the top with a somewhat larger opening 19 at the bottom which is threaded. These threads engage the threaded periphery of a plunger 20 which has a turned down portion 21 projecting through the opening 18 for support. The bushing 15 is secured in any suitable manner, for example by a key (not shown), to the hand wheel 14 so that if the plunger 20 were to be prevented from rotating in a manner described hereinafter and the hand wheel 14 rotated, the plunger would move up and down with respect to the bushing depending on the direction of the rotation of the hand wheel.

The plunger 20 carries at its lower end a circular flange member 21' which has dependent therefrom a circular flange member 22 having an opening through the flange to receive the rod 23. The latter extends over substantially the entire distance across the internal diameter of the bonnet 9. There is inserted in the circular space of the flange portion 22 an upstanding projection 23' from the diaphragm 8. This projection is provided with a horizontal opening corresponding with the openings in the portion 22 for receiving the rod 23.

As can be seen more clearly in Figures 1 and 2, there is swiveled about the rod 23 a metal backing member 24 which conforms to a general circular configuration and is provided with a pair of spaced concentric rings 25. These rings are provided with openings through which the rod 23 projects. Extending radial outwardly from the outer ring 25 there are a number of teeth-like projections, each having a wedge shaped configuration as seen in Figure 3. The upper and lower surfaces of the projections 26 are of a predetermined character depending on the considerations which will be discussed in connection with the operation of the valve.

The interior surface of the bonnet 9 is provided with a plurality of integrally joined and inwardly projecting teeth 27 which as shown in Figure 3, interleave the teeth 26 leaving preferably only a sufficient space between the two sets of teeth as to assure the proper clearance. These teeth have a shape comparable to ordinary gear teeth in that the width at the base is considerably more than the width at the tip, and the depth of each tooth is not so great as to reduce its resistance to shear or fracture. This depth, as illustrated, is approximately the same as the greatest width of the tooth. The teeth 27 extend substantially the entire depth of the bonnet interior and are chamfered at the lower end at such a position and angle as to overlap the upper edge of the teeth 26 when the valve is in the closed position as shown in Figure 1. This overlapping portion is indicated generally by the reference character 28. It was pointed out that the rod 23 extends across substantially the entire inner diameter of the bonnet 9 and in order to do this, it is apparent that the rod must be positioned between two pairs of oppositely disposed teeth 27. Inasmuch as the backing member 24 and the bonnet 9 are usually cast out of silicon iron, which is extremely hard to machine, the teeth 26 are made to fit the slots between the teeth 27 quite loosely. Consequently, a certain amount of play is present between the teeth which would normally permit rotation between the back member and the bonnet. However, the rod 23 can be made of a metal which is readily machinable since it never comes in contact with the corrosive fluid which passes through the conduit 2, or which might seep into or permeate the diaphragm 8 in small quantities. The rod may therefore be readily dimensioned as to length and diameter so as to prevent even the slightest movement between the backing member and the bonnet. Thus any tendency for the center part of the diaphragm or its backing member to rotate upon turning the hand wheel 14 is completely eliminated.

As can be seen more especially in Figure 4, there is a space 30 between the outer surface of the flange portion 22 and the inner surface of the inner ring 25 of the backing member 24. This space is left for the purpose of permitting, for example, the right hand end of the backing member as seen in Figure 4 to swing slightly upwardly or downwardly, thus allowing the diaphragm 8 to assume slightly changed positions depending on the amount of swivel permitted by the backing member 24. It will be noted that as one end of the diaphragm, for example the right hand end (as seen in Figure 4), moves slightly upwardly and the left hand end moves slightly downwardly due to a change in position of the backing member 24 on the swivel rod 23, the central portion 24 of the diaphragm readily accommodates this change in position on account of the flexible or elastic character of the diaphragm material.

Thus the lower surface of the diaphragm 8 can readily be made to accommodate itself to any irregularity, for example, any slight inclination or declination of the surface of the weir 4. The adaptability of the diaphragm to perform this function and brought about by the manner in which the diaphragm and its backing member 24 are pivoted on the rod 23 is highly desirable in that it eliminates the necessity for any truing up or other machine work on the weir 4. It will be understood that when the valve body is made of silicon iron in order to withstand corrosion by acid, the metal is extremely hard to machine so that in the absence of a swiveled diaphragm and backing member, a tight joint between the diaphragm and the weir cannot be always assured.

Figure 1 shows the valve in its closed position with the plunger 20 moved a considerable distance downward by rotating the hand wheel 14. Under these conditions the lower surface of the diaphragm contacts three areas on the valve body, namely the segmental seats 7 and the weir or hump 4. The lower surface of the backing member 24 is provided with a depression of concave configuration and it will be noted that the lower edges of the teeth 26 are provided with such a shape that the diaphragm is given a gentle flex in the opposite direction just before the seat is reached. The teeth 26 extend so close to the inner surface of the bonnet 9 as to leave little or no space across which the diaphragm has no direct backing member. Except for the spaces between the teeth and the small annular space indicated at 31, the diaphragm has a strictly continuous i. e., completely unbroken metal surface which backs up the diaphragm. It will be understood that the inter teeth space may be fairly short as measured in the radial direction and since by far the largest portion of the backing surface is constituted of the member 24, the diaphragm is able to withstand extremely high fluid velocities and pressures without rupture.

Figure 2 shows the position of the diaphragm when the hand wheel 14 is moved to the open valve position. By rotating the hand wheel in a direction opposite to that shown in Figure 1, the plunger 20 can be raised carrying with it the backing member 24. The teeth 26 of the backing member move upwardly between the teeth 27 of the bonnet as does also the rod 23. The pressure of the fluid passing through the valve is sufficient to cause the diaphragm to still contact the lower surface of the backing member and since the latter has a concave surface, the diaphragm will maintain its upward flexure as in the case of the closed valve position.

However, the outer portions of the diaphragm, i. e., those portions just inside of the bonnet interior also flex upwardly and rest against the lower edges of the teeth 27. The contour of these edges is preferably such as to represent a continuation of the concave contour of the backing member as can be seen more clearly in Figure 2. Thus, as the diaphragm is raised to the open valve position, it assumes a concave configuration over its entire area within the bonnet and is supported at its central portion by the continuous surface of the backing member 24, and at its outer portion is supported by the lower edges of the teeth 27. The diaphragm is therefore backed by an unbroken metal surface except at the spaces between the teeth 27 and a small annular space indicated at 32. As in the case of the closed valve condition described above, the depth of the teeth 27 may be made so small that it can be fairly said that the diaphragm is substantially backed over its entire surface by an unbroken or continuous metal surface. Thus when the valve is in its open position as in the case of its closed position, the diaphragm is backed so strongly as to resist any tendency to rupture even when handling fluid at high velocities or pressures.

It was pointed out in connection with the description of Figure 1 that even when the teeth 26 were in their lowermost or closed valve position, the upper edge of these teeth still overlapped the lower edge of teeth 27. There is therefore no tendency for the teeth of the backing member to get out-of-mesh with the teeth of the bonnet and thus a possible source of failure of the valve is eliminated. By extending the rod 23 into the space between the teeth 27, the possibility of the backing member 24 becoming slightly rotated due perhaps to the swirling action of the passing fluid or for other reasons is still further minimized.

It was pointed out in connection with both figures that the diaphragm 8 maintains a convex form when the valve is in the open and closed positions. In other words, the diaphragm positively does not change from a convex form to a concave form or vice versa under these conditions. It is apparent that since the diaphragm is made of a material such as rubberized fabric which tends to harden over long periods of time or when exposed to fluid, a diaphragm which assumes substantially the same shape, i. e. it is flexed in the same direction regardless of whether the valve is open or closed, should and will have a much longer life than a diaphragm which is flexed from an extreme concave position to an opposite or extreme convex position. Obviously, the strains introduced in the diaphragm are enhanced in proportion to the change in flexure and the direction of flexure.

It will also be noted that in the improved valve, the diaphragm is always being subjected to a compressional stress in the valve open and valve closed positions and the fabric of the diaphragm lends greater resistance to a compressional stress than to a tensile stress so that the life of the diaphragm is still further enhanced. Moreover, the stresses throughout the metal parts of the valve are always in the same direction, i. e. in compression and here again, the design can be simplified with this in view.

It will be understood that I desire to comprehend within this invention such modifications as come within the scope of the claims and the invention.

Having thus fully described my invention, what I claim as new and desire to secure by Letters Patent, is:

1. A valve for a conduit having inlet and outlet pipes in line, a weir interposed therebetween, a seat on the valve for receiving the edge portion of a diaphragm which diaphragm is adapted to contact the weir and to thereby close the valve, the central portion of said diaphragm being contained within a bonnet which is seated on said edge portion of the diaphragm, said bonnet being of a hollow cylindrical configuration, a plunger adapted to be moved longitudinally through the bonnet, said plunger terminating in a swivel bearing adapted to receive a rod which extends transversely of said bonnet, a backing member of circular configuration for said diaphragm rockably mounted on said rod, and teeth extending radially outward from said backing member and meshing with teeth which extend radially inwardly from said bonnet, said teeth serving in part to support the diaphragm in the open and closed valve positions of the backing member, said rod extending to a distance sufficient to contact a pair of the teeth which extend inwardly from the bonnet whereby the rod is prevented from moving in a radial direction with respect to the bonnet but is permitted to move in a longitudinal direction with respect to the bonnet as the plunger is moved through the bonnet whereby the backing member can assume a position such as to cause the diaphragm to clamp tightly on the weir when the valve is closed and yet the backing member is prevented from moving in the radial direction with respect to the bonnet during the excursions of the plunger.

2. A valve for a conduit having inlet and outlet pipes, a seat on the valve for receiving the edge portion of a diaphragm which is adapted to close the valve, the central portion of said diaphragm being contained within a bonnet which is seated on said edge portion of the diaphragm, said bonnet being of a hollow elongated configuration, a plunger adapted to be moved longitudinally through the bonnet, said plunger terminating in a swivel bearing, a rod which extends transversely of said bonnet and said bearing, a backing member for said diaphragm rockably mounted on said rod, and projections extending outwardly from said backing member and meshing with projections which extend inwardly from said bonnet, said projections serving in part to support the diaphragm in the open and closed valve positions of the backing member, said rod extending a distance such as to contact the opposite interior surfaces of the bonnet, whereby the rod is prevented from sliding lengthwise.

3. A valve for a conduit having inlet and outlet pipes, a seat on the valve for receiving the edge portion of a diaphragm which is adapted to close the valve, the central portion of said diaphragm being contained within a bonnet which is seated on said edge portion of the diaphragm, said bonnet being of a hollow elongated configuration, a plunger adapted to be moved longitudinally through the bonnet, said plunger terminating in a swivel bearing, a rod which extends transversely of said bonnet and said bearing, a backing member for said diaphragm rockably mounted on said rod, and projections extending outwardly from said backing member and meshing with projections which extend inwardly from said bonnet, said projections serving in part to support the diaphragm in the open and closed valve positions of the backing member, said rod extending a distance such as to contact the opposite interior surfaces of the bonnet, whereby the rod is prevented from sliding lengthwise and having a size such as to contact the inner surfaces of oppositely disposed pairs of projections which extend from said bonnet, whereby the backing member is prevented from rotating with respect to the bonnet.

OYSTEIN JACOBSEN.